United States Patent Office 3,180,784
Patented Apr. 27, 1965

3,180,784
SYNTHETIC LIGNOCELLULOSE STRUCTURAL PRODUCTS
John G. Meiler, Cleveland, Tenn., assignor, by mesne assignments, to United States Plywood Corporation, New York, N.Y., a corporation of New York
No Drawing. Filed Apr. 7, 1960, Ser. No. 20,560
20 Claims. (Cl. 161—151)

This invention relates to synthetic structural products fabricated from lignocellulose materials and to a method for the manufacture thereof. More particularly, this invention relates to synthetic structural products fabricated from lignocellulose material and a novel resin binder composition.

In an attempt to provide more adaptable products and more fully to utilize available natural resources, the wood industry has developed an extensive variety of structural products which have come to be known as "hardboard." Synthetic hardboards are manufactured by associating wood fibers with minor proportions of resin binders, forming the admixed fibers and resin into a unitary mat, and consolidating the mat by the application of heat and pressure into a solid board. An annular synthetic hardboard production in the United States of over one billion square feet (⅛ inch basis) appropriately reflects the commercial significance of synthetic hardboard products.

The properties of hardboard may be controlled to some extent by proper choice of nature and the form of the lignocellulose particles. Hardboards of high strength advantageously utilize woods of high strength. Additionally, reducing the wood substantially to ultimate fibers rather than merely to fiber bundles tends to increase the strength of the hardboard and also imparts a finer texture to the product. The utilization of long fibers likewise enhances the strength of the board. Since the fibers are deposited in random orientation when the mat is formed, hardboards generally exhibit substantially equal strength in all directions.

The properties of hardboards also may be influenced by the final compacting operation. Thus, for example, boards compacted to higher densities generally exhibit higher strength and better dimensional stability. The use of several different pressures during the compacting operation also influences the properties of the product.

The wood industry likewise has investigated extensively the relation of various resin binders to the characteristics of hardboard. The binder unites the fibers into a unitary structure and the strength of the final product obviously will depend, in part, upon the resin employed.

Phenol-formaldehyde thermosetting resins have found wide use in the wood industry as resin binders for hardboard since they are readily available commercially and are capable of providing high hardboard strength. To be of commercial significance as a binder for hardboard, the resin must be of the water-soluble type. As a consequence, the industry originally necessarily employed only the relatively lower molecular weight phenol-formaldehyde resins which could be obtained in the water-soluble form. Such resins, however, produced somewhat erratic results and, in practice, failed to provide hardboard of anticipated ultimate strength characteristics. Since this difficulty apparently was due to the absorption of the resin into the fiber, the art attempted to develop water-soluble higher molecular weight resins which would remain essentially on the wood fiber surface. Higher molecular weight alkaline phenol-formaldehyde resins soluble in water were produced and employed by the hardboard industry in lieu of the low molecular weight resins first utilized. Such higher molecular weight resins, apparently remaining at the surface of the fiber, produced hardboards of greater strength. United States Patents 2,631,097 and 2,631,098 constitute typical examples of water-soluble resins of high molecular weight.

Hardboards generally contain less than 10% resin and, hence, are essentially wood products rather than resin products reinforced with wood fiber. Consequently, the tendency of wood to swell when exposed to moisture manifests itself in hardboards. In an effort to impart resistance to swelling due to moisture adsorption, the art has employed wax in conjunction with phenol-formaldehyde. Wax employed in amounts of from about 0.5 to about 5.0% significantly reduces water absorption by the wood fibers. When used in quantities which exceed about 5.0%, the wax becomes more detrimental than beneficial and, consequently, further improvement in resistance to water absorption by utilizing greater proportions of wax has not been attractive. While present methods of employing phenol-formaldehyde resins in conjunction with wax produce commercially acceptable hardboard products, nevertheless, the art continues to seek methods of employing phenol-formaldehyde resins to provide a product having even more enhanced swelling characteristics.

Accordingly, it is a primary object of this invention to provide a synthetic structural product fabricated from lignocellulose material and a phenol-formaldehyde resin binder composition.

It is an additional object of this inveniton to provide a synthetic structural product fabricated from lignocellulose material sized with wax and a phenol-formaldehyde resin binder composition that exhibits improved dimensional stability and strength as compared with hardboard products of the prior art.

It is a more specific object of this invention to provide a hardboard product containing a phenol-formaldehyde resin binder that exhibits excellent strength.

It is a further object of this invention to provide a method of manufacturing a hardboard product containing a phenol-formaldehyde resin binder that exhibits enhanced properties.

Generally described, this invention embraces a synthetic structural product fabricated from lignocellulose material by a dry method which comprises separately admixing with lignocellulose fibers (a) a water-soluble, two dimensional phenol-formaldehyde resin having an average molecular weight within the range of from about 150 to about 3,000 and preferably from about 200 to about 1,000 and (b) a water-soluble, two dimensional phenol-formaldehyde resin having an average molecular weight of from about 5,000 to about 15,000 and preferably from about 8,000 to about 12,000 in a weight ratio (a):(b) of from about 2:1 to about 1:2 and preferably about 1:1 to provide from about 0.75% to about 10% by weight of resins (a) and (b) per dry weight of fibers, forming the fibers and associated resin into a unitary mat, and consolidating the mat into a structural product by means of heat and pressure. The invention further embraces the method of manufacturing such synthetic structural products.

A preferred embodiment of this invention constitutes the utilization of from about 0.5 to about 5.0% and most appropriately from about 1½ to about 2½ by weight of wax based on the weight of the dry fibers in conjunction with the above identified resins.

While the hardboard art has progressed from the prior practice of utilizing the then available water-soluble low molecular weight phenol-formaldehyde resins to the present practice of utilizing the more recently available water-soluble higher molecular weight synthetic resins, no single phenol-formaldehyde resin in conjunction with wax provides simultaneously the high strength and the excellent dimensional stability which is obtained by the practice of the present invention. While a lower molecular weight resin might be expected to penetrate into the fibers and provide a measure of resistance to swelling, and the high molecular resin might be expected to remain at the surface and provide greater strength, the combination of a low molecular weight phenol-formaldehyde resin with a high molecular weight phenol-formaldehyde resin also would be expected to provide a hardboard having less strength than a board produced with a like amount of high molecular weight resin and less swelling resistance than a board produced with a like amount of low molecular weight resin. It has been found, however, that the combination of a low molecular weight water-soluble phenol-formaldehyde resin with a high molecular weight water-soluble phenol-formaldehyde resin produces a hardboard which has greater strength than one produced with a like amount of higher molecular weight resin and, further, exhibits greater resistance to swelling than a board produced with a like amount of lower molecular weight phenol-formaldehyde resin.

In the event that dimensional stability is not significant, the conjoint utilization of phenol-formaldehyde resins in accordance with this invention, provides a product having increased strength. When the phenol-formaldehyde resins are employed in conjunction with wax, both the strength and dimensional stability of the product are enhanced.

The present invention also permits the utilization of resin solutions which are not highly alkaline. While alkaline fiber mixtures are within the contemplation of the invention, alkalinity generally adversely effects the effectiveness of the wax and the combined pH of the resin and fiber mixture desirably is maintained below 7. As the molecular weight of the phenol-formaldehyde resin is increased, however, the alkalinity of water solutions of the resin also generally increases. Since excellent hardboards may be manufactured according to this invention employing a solution of a medium molecular weight resin having a comparatively low alkalinity as the second component of the resin mixture, the combined pH of the resin and fiber mixture more easily may be maintained in the lower pH ranges.

The phenol-formaldehyde resins operable in the practice of the present invention, are those two dimensional resins of requisite molecular weight which are water-soluble, fusible, and capable of being converted to the thermoset stage upon the application of heat and pressure. These resins conventionally are produced by reacting phenol and formaldehyde in the presence of an alkaline catalyst. Formaldehyde is employed in sufficient excess to enable the resin to be converted to the thermoset stage upon subsequent heating of the partially polymerized resin. As employed herein, "phenol" embraces phenol, cresol and resorcinol or mixtures thereof. The resin solutions appropriately may contain from about 30% to about 75% resin solids. Since phenol-formaldehyde resins are well-known to the art, they will not further be described.

In the event that the hardboard is made up of a single homogeneous layer of fibers, the resin binder is employed in amounts within the range of from about 0.75% to about 10%, and preferably from about 1.5% to about 5% by weight of resin binder per dry weight of fibers. If the hardboard is formed by depositing several layers of fibers, as for example one or more core layers between two surface layers, it is desirable to employ more resin binder in the surface layers than in the core layer. Thus, the core layer advantageously may contain from about 0.75 to about 2.5% by weight of resin binder and the surface layers advantageously may contain from about 2.5% to 10% by weight of resin binder.

The wax employed in conjunction with the present invention constitutes any of the waxes known to the art and generally referred to as water-repellant or sizing materials. For example, the wax may be paraffin wax, petrolatum or the like. The hardboard product preferably will contain from about 0.5 to about 5.0% wax based on the dry weight of the lignocellulose fibers. The wax may be added to the fibers either before or after the addition of the resin. It is generally preferable, however, to add the sizing before adding the resins.

The lignocellulose fibers employed in the practice of this invention may constitute any of the fibers known to the art. The fibers may be of the coniferous species, such as pine, cedar, hemlock and Douglas fir; or of the deciduous species, such as hickory, oak, beech, birch and maple. As used herein, the term "fiber" embraces relatively small fiber bundles as well as the ultimate fibers themselves.

The heat and pressure necessary to convert the felted mat into the final consolidated product will depend to some extent on the desired properties of the final board. Generally, pressures within the range of from about 50 p.s.i. to about 1,000 p.s.i. or more and temperatures from about 250° F. to about 500° F. are employed by the art.

The present invention advantageously is practiced in conjunction with a "dry process' and will be so described. The term "dry process" indicates that the fibers are conveyed to and deposited as a mat in the felter by a gaseous rather than a liquid vehicle. The fibers are not completely dry in the sense of containing no moisture. Indeed, in various prior art dry processes, the fiber moisture content has varied from 5% or below to about 100% based on the dry weight of fiber. Such process avoids extensive leaching and produces fibers which contain substantially all of the substance of the raw lignocellulose starting material.

The particular dry process or the particular equipment employed is not critical to the practice of the present invention. For purposes of illustration, however, a typical dry process will be described.

Normally, logs or mill residue are reduced to chips in a conventional chipper and the chips then are treated further to reduce the lignocellulose to ultimate fibers. Such further treatment may constitute a short steaming at steam pressures from 25 o 100 p.s.i. to soften the chips followed by defibrating in a roating disk and screw press defibrator or in a rotating disk defibrator alone. The steaming preferably is kept to a minimum in order to prevent the formation of water-soluble materials in the chips.

The fibers then are conveyed by heated air and/or combustion gases or the like from the defibrator to subsequent stages of the process including the felting step. While the heated carrier gas acts as a dehydrating gas to dry the fibers, a dryer utilizing a dehydrating gas may also be employed if desired. Before the fibers are felted into a mat, they are subjected to any desired combination of steps of air separation, classification, and the like, to meet special requirements. In one preferred combination of steps, the fibers are conveyed to cyclones where a desired amount of air is removed. From the cyclones, the semi-dry fibers are transferred to a clasifier for separation into fine and coarse fiber components. Alternatively, the fibers may be separated into two or more portions having the same coarseness.

In the event that a uniform resin content throughout the mat is desired, the resin may be admixed with the fibers in the defibrator simultaneously with the defiberizing operation; the resin may be blended with the fibers in a blender prior to classification or separation; or the resin may be injected into a moving gas stream containing suspended fibers. Conventional blenders are normally equipped with injection means for the resin solutions and with mechanical agitating means for effecting an intimate intermixing of the resin and fiber. The two resin solutions are injected separately onto the fibers. The order of addition of the resin solutions is not critical to the practice of the invention. The solutions may be injected simultaneously through different injection means, or first one then the other solution may be injected onto the fibers.

In the event that it is desired to vary the resin content from layer to layer within a hardboard utilizing the same species of fiber in all layers, the resins advantageously are blended with the fiber streams subsequent to classification or separation.

The fibers, having been mixed with the desired amount of resin binder, are air-conveyed to a conventional felter. In a typical felting operation, the fibers are blown downwardly onto a moving foraminous belt to form a multiple layer mat coarse fibers in the middle layer and fine fibers in one or both of the surface layers. Alternatively, a single layer mat or a mat having two or more layers of the same coarseness may be formed in the felter. The felted mat is precompacted to a substantially self-sustaining condition. The partially compacted mat then is ready for final consolidation wherein the mat is compressed to final thickness and the binder is cured.

If S-2-S boards (smooth on both sides) are to be produced, it is highly desirable that the average moisture content of the mat at the time of final consolidation be in the range of from about 8% to about 14% of the dry weight of the fiber. Moisture contents appreciably below 8% tend to result in hardboards having soft fibrous surfaces and moisture contents appreciably above 14% tend to result in hardboards having blisters or flaw marks on their surfaces.

If S-1-S boards (smooth on one side) are to be produced, the moisture content of the final mat may vary considerably. For example, the mat may have a moisture content of from 30-50% or from 60 to 120% depending upon the particular process employed.

Final consolidation conventionally is effected by placing the mat between a pair of smooth metal caul plates or screens which, in turn, are positioned in a standard hydraulic press.

The process is especially advantageous for the production of boards having a specific gravity of from about 0.8 to about 1.2, but boards of greater or lesser density may be manufactured by the process.

While the above process has been described utilizing a single species of fiber, it will be apparent that mixtures of different wood chips can be employed or that two or more different kinds of wood fibers can be processed individually and combined into a composite board. For example, unbarked oak can be processed and employed as a core layer and a separately processed higher grade fiber such as beech, birch, maple, pine or the like can be employed as surface layers.

The following examples are presented for purposes of more specific illustration of this invention. It is not intended that the scope of the invention be limited by the specific embodiments described.

EXAMPLE I

Mixed hardwood chips (45% hickory, 45% red and white oak and 10% miscellaneous hardwoods) were subjected to a short steaming operation to soften the chips and then were defibered in a rotating disc defibrator. Following defibration, the fibers were separated into two fractions, each of which was separately treated with resin and wax. The fiber was placed in a 30-inch diameter by 30-inch high steel container which was equipped with a two-blade propeller and a small head tank for resin and wax. A wax emulsion was sprayed into the fibers in the fiber mixer over a time period of from 10 to 15 minutes, the total wax added approximating 2.5% based upon the dry weight of the fibers. Subsequently the resins were separately sprayed as 5% solutions into the fiber mixer over an additional period extending from 10 to 15 minutes. The lower molecular weight resin was added first followed by the addition of the higher molecular weight resin. Following the addition of the resin into the fiber, the fiber was conveyed to a cyclone by hot air which served to dry the fiber. The fiber fractions were felted into a three-layer mat, the surface layers each constituting 15% of the total material of the mat and the single core layer constituting the remaining 70% of the mat. Finally, the mat was subjected to heat and pressure to produce a final hardboard product.

In order to demonstrate the present invention Formula A specified surface layers containing 2.5% of a water-soluble phenol-formaldehyde resin having an average molecular weight of 250, a viscosity of 165–325 cps. at 25° C. and a pH of 8.3 (American Marietta "Amres" 6100A, hereinafter identified as resin A), and 2.5% of a water-soluble phenol-formaldehyde resin having a molecular weight of about 10,000, a viscosity of 165–325 cps. at 25° C. and a pH of 9.7 (American Marietta "Amres" 6122, hereinafter identified as resin B). The core layer contained 0.75% of resin A and 0.75% of resin B.

For purposes of comparison Formula B specified 5% of resin A in each surface layer and 1.5% of resin B in the core layer. Additionally, Formula C specified 5% of resin B in each surface layer and 1.5% of resin B in the core layer.

Specimens formulated according to the above Formulas A, B and C and having a specific gravity of 1.0, exhibit the characteristics set forth in Table 1. It will be noted that all three formulations specify a surface layer having 5% resin and a core layer having 1.5% resin to provide a total resin content of 2.6%. The water absorption, swelling and linear expansion characteristics were determined by soaking the boards in water for 24 hours. Specimen A represents the practice of this invention.

Table 1

| Board | Modulus of Rupture (p.s.i.) | Percent Water Absorption | Percent Thickness Swelling | Percent Linear Expansion |
|---|---|---|---|---|
| A | 6,280 | 14.6 | 8.4 | 0.38 |
| B | 5,870 | 16.3 | 12.3 | 0.41 |
| C | 5,600 | 18.0 | 11.9 | |

EXAMPLE II

Specimen boards prepared according to Example I, but having a specific gravity of 1.1, exhibit the characteristics set forth in Table 2 below.

The resin content of boards A', B' and C' correspond with the resin content of boards A, B and C respectively. Board A' exemplifies this invention.

Again, each board contains 5% resin in the surface layers and 1.5% resin in the core layers to provide a total resin content of 2.6%. The water absorption, swelling and linear expansion characteristics were determined by soaking the boards in water for 24 hours.

Table 2

| Board | Modulus of Rupture (p.s.i.) | Percent Water Absorption | Percent Thickness Swelling | Percent Linear Expansion |
|---|---|---|---|---|
| A' | 8,380 | 12.7 | 5.2 | 0.33 |
| B' | 7,860 | 14.0 | 8.6 | 0.37 |
| C' | 8,300 | 14.9 | 9.4 | |

I claim:
1. A structural hardboard product fabricated by a dry method which comprises admixing with lignocellulose fiber (a) a water-soluble, two dimensional phenol-formaldehyde resin having an average molecular weight within the range of from about 150 to about 3,000 and (b) a water-soluble, two dimensional phenol-formaldehyde resin having an average molecular weight of from about 5,000 to about 15,000 in a weight ratio (a):(b) of from about 2:1 to about 1:2 to provide from about 0.75% to about 10% by weight of resin per dry weight of fibers, forming the fibers and associated resin into a unitary mat and consolidating the mat into a structural product by means of heat and pressure.

2. The hardboard of claim 1 wherein resin (a) is characterized by a molecular weight of from about 200 to about 1,000 and resin (b) is characterized by a molecular weight of from about 8,000 to about 12,000.

3. The hardboard of claim 1 having a specific gravity of from about 0.8 to about 1.2.

4. The hardboard of claim 1 containing resins (a) and (b) in a total amount of from about 1.5% to about 5% by weight of resin based on the dry weight of the fibers.

5. The hardboard of claim 1 containing from about 0.5 to about 5.0% of wax.

6. The hardboard of claim 5 having a core layer containing from about 0.75 to about 2.5% by weight of resins (a) and (b) and having surface layers containing from about 2.5% to about 10% by weight of resins (a) and (b).

7. The hardboard of claim 5 wherein resin (a) is characterized by a molecular weight of from about 200 to about 1,000 and resin (b) is characterized by a molecular weight of from about 8,000 to about 12,000.

8. The hardboard of claim 5 having a specific gravity of from about 0.8 to about 1.2.

9. The hardboard of claim 5 containing resins (a) and (b) in a total amount of from about 1.5% to about 5% by weight of resin based on the dry weight of the fibers.

10. A synthetic hardboard product fabricated by a dry method which comprises separately admixing with lignocellulose fibers containing from about 1.5 to about 2.5% of wax (a) a water-soluble, two dimensional phenol-formaldehyde resin having an average molecular weight within the range of from about 200 to about 1,000 and (b) a water-soluble, two dimensional phenol-formaldehyde resin having an average molecular weight of from about 8,000 to about 12,000 in a weight ratio (a):(b) of from about 2:1 to about 1:2 to provide from about 1.5% to about 5% by weight of resins (a) and (b) per dry weight of fibers, forming the fibers and associated resins into a unitary mat and subjecting the mat to heat and pressure to produce a structural product having a specific gravity of from about 0.8 to about 1.2.

11. A dry method of producing a structural hardboard product which comprises admixing with lignocellulose fiber (a) a water-soluble, two dimensional phenol-formaldehyde resin having an average molecular weight within the range of from about 150 to about 3,000 and (b) a water-soluble, two dimensional phenol-formaldehyde resin having an average molecular weight of from about 5,000 to about 15,000 in a weight ratio (a):(b) of from about 2:1 to about 1:2 to provide from about 0.75% to about 10% by weight of resin per dry weight of fibers, forming the fibers and associated resin into a unitary mat and consolidating the mat into a structural product by means of heat and pressure.

12. The method of claim 11 wherein resin (a) is characterized by a molecular weight of from about 200 to about 2,000 and resin (b) is characterized by a molecular weight of from about 8,000 to about 12,000.

13. The method of claim 11 wherein the mat is consolidated to form a hardboard having a specific gravity of from about 0.8 to about 1.2.

14. The method of claim 11 wherein resins (a) and (b) are employed in a total amount of from about 1.5 to about 5% by weight based on the dry weight of the fibers.

15. The method of claim 11 wherein the lignocellulose fibers contain from about 0.5 to about 5.0% of wax.

16. The method of claim 15 wherein resin (a) is characterized by a molecular weight of from about 200 to about 2,000 and resin (b) is characterized by a molecular weight of from about 8,000 to about 12,000.

17. The method of claim 15 wherein the mat is consolidated to form a hardboard having a specific gravity of from about 0.8 to about 1.2.

18. The method of claim 15 wherein resins (a) and (b) are employed in a total amount of from about 1.5 to about 5% by weight based on the dry weight of the fibers.

19. A dry method of producing a synthetic hardboard product which comprises separately admixing with lignocellulose fibers containing from about 1.5 to about 2.5% of wax (a) a water-soluble, two dimensional phenol-formaldehyde resin having an average molecular weight within the range of from about 200 to about 1,000 and (b) a water-soluble, two dimensional phenol-formaldehyde resin having an average molecular weight of from about 8,000 to about 12,000 in a weight ratio (a):(b) of from about 2:1 to about 1:2 to provide from about 1.5% to about 5% by weight of resins (a) and (b) per dry weight of fibers, forming the fibers and associated resins into a unitary mat and subjecting the mat to heat and pressure to produce a structural product having a specific gravity of from about 0.8 to about 1.2.

20. The method of fabricating a lignocellulose fiber which comprises,
(1) separately admixing with a first portion of lignocellulose fibers (a) a water-soluble, two dimensional phenol-formaldehyde resin having an average molecular weight within the range of from about 150 to about 3,000 and (b) a water-soluble, two dimensional phenol-formaldehyde resin having an average molecular weight of from about 5,000 to about 15,000 in a weight ratio (a):(b) of from about 2:1 to about 1:2 to provide from about 0.75% to about 2.5% by weight of resins (a) and (b) per dry weight of fibers; and
(2) separately admixing with a second portion of lignocellulose fibers (a) a water-soluble, two dimensional phenol-formaldehyde resin having an average molecular weight within the range of from about 150 to about 3,000 and (b) a water-soluble, two dimensional phenol-formaldehyde resin having an average molecular weight of from about 5,000 to about 15,000 in a weight ratio (a):(b) of from about 2:1 to about 1:2 to provide from about 2.5% to about 10% by weight of resins (a) and (b) per dry weight of fibers;

forming the fibers and associated resin into a unitary mat having the fibers prepared in step (1) as a core layer and the fibers prepared in step (2) as surface layers, and consolidating the mat into a structural product by means of heat and pressure.

References Cited by the Examiner
UNITED STATES PATENTS

| | | | |
|---|---|---|---|
| 2,066,734 | 1/37 | Loetscher | 154—45.9 |
| 2,620,288 | 12/52 | Schrader et al. | 154—45.9 |
| 2,620,321 | 12/52 | Schrader et al. | 154—45.9 |
| 2,785,975 | 3/57 | Sheeran | 162—165 |
| 2,805,209 | 9/57 | Bowen et al. | 154—101 X |
| 2,856,381 | 10/58 | McNaughtan et al. | 260—43 |
| 3,081,217 | 3/63 | Pearson | 161—262 X |

FOREIGN PATENTS
506,941  11/54  Canada.

ALEXANDER WYMAN, Primary Examiner.

EARL M. BERGERT, CARL K. KRAFFT, Examiners.